United States Patent
McNeilly et al.

(10) Patent No.: US 10,041,856 B2
(45) Date of Patent: Aug. 7, 2018

(54) METHOD AND APPARATUS FOR MEASURING PHYSICAL DISPLACEMENT

(71) Applicant: Cleveland Electric Laboratories Company, Twinsburg, OH (US)

(72) Inventors: Michael McNeilly, Tempe, AZ (US); John J. Martin, Tempe, AZ (US)

(73) Assignee: Cleveland Electric Laboratories Company, Twinsburg, OH (US)

( * ) Notice: Subject to any disclaimer, the term of this patent is extended or adjusted under 35 U.S.C. 154(b) by 9 days.

(21) Appl. No.: 15/446,800

(22) Filed: Mar. 1, 2017

(65) Prior Publication Data

US 2017/0254722 A1    Sep. 7, 2017

Related U.S. Application Data

(60) Provisional application No. 62/301,927, filed on Mar. 1, 2016.

(51) Int. Cl.
*G01B 7/16* (2006.01)
*G01M 5/00* (2006.01)

(52) U.S. Cl.
CPC .......... *G01M 5/0041* (2013.01); *G01B 7/16* (2013.01); *G01M 5/0008* (2013.01)

(58) Field of Classification Search
CPC ...... G01M 5/0041; G01M 5/0008; G01B 7/16
USPC ........................................................ 73/766
See application file for complete search history.

(56) References Cited

U.S. PATENT DOCUMENTS

| 4,138,884 | A |   | 2/1979  | Ruoff, Jr. et al. |
|-----------|---|---|---------|------|
| 4,263,810 | A | * | 4/1981  | Chiu ..................... G01B 11/168 250/225 |
| 4,488,441 | A |   | 12/1984 | Ramming |
| 4,501,160 | A | * | 2/1985  | Johnson ................ G01L 1/2243 177/156 |
| 4,799,558 | A | * | 1/1989  | Griffen ................ G01G 3/1408 177/211 |
| 5,296,654 | A | * | 3/1994  | Farley .................... G01G 11/04 177/119 |
| 5,429,007 | A |   | 7/1995  | Khachaturian |
| 5,440,077 | A | * | 8/1995  | Konishi ............... G01G 3/1414 177/185 |
| 5,589,686 | A | * | 12/1996 | Ohara .................... G01B 7/003 250/307 |
| 6,073,496 | A |   | 6/2000  | Kuhn |
| 6,354,152 | B1 |  | 3/2002  | Herlik |

(Continued)

*Primary Examiner* — Max Noori
(74) *Attorney, Agent, or Firm* — Emerson, Thomson & Bennett, LLC; Roger D. Emerson

(57) ABSTRACT

Provided is a displacement sensor assembly which includes a cantilever beam, a reaction block, a strain sensor, and a temperature sensor. The cantilever beam is physically oriented such that the longitudinal axis of the cantilever beam is perpendicular to the direction of displacement. A first end of the cantilever beam is fixably mounted to a fixed reference and a first end of the reaction block is fixably mounted to a moving reference. A second end of the cantilever beam is joined to a second end of the reaction block. The strain sensor is mounted and calibrated to detect displacement between the fixed and moving reference by measuring strain on the second end of the cantilever beam, and the temperature sensor is mounted and calibrated to counteract the effect of thermal strain on the sensor assembly and a method of use therefore.

15 Claims, 3 Drawing Sheets

(56) References Cited

U.S. PATENT DOCUMENTS

| | | |
|---|---|---|
| 6,367,335 B1 | 4/2002 | Hicks |
| 6,834,552 B1 | 12/2004 | Thorsen |
| 7,646,945 B2 | 1/2010 | Jones |
| 7,701,586 B2 | 4/2010 | Otugen |
| 7,720,324 B2 | 5/2010 | Haase |
| 7,743,672 B2 | 6/2010 | Kurtz et al. |
| 8,276,461 B2 | 10/2012 | Zwygart |
| 8,701,500 B2 | 4/2014 | Swinehart |
| 8,780,335 B2 | 7/2014 | Van Steenberge |
| 9,109,883 B2 | 8/2015 | Ansari et al. |
| 9,518,882 B2 | 12/2016 | McNeilly |
| 2002/0154860 A1 | 10/2002 | Fernald et al. |
| 2004/0114850 A1 | 6/2004 | Dewyntermarty et al. |
| 2005/0169568 A1 | 8/2005 | Shang et al. |
| 2007/0193362 A1 | 8/2007 | Ferguson |
| 2011/0107842 A1 | 5/2011 | Dargahi |
| 2012/0132008 A1 | 5/2012 | Way et al. |
| 2013/0239701 A1 | 9/2013 | Huang |

\* cited by examiner

METHOD AND APPARATUS FOR MEASURING PHYSICAL DISPLACEMENT

This application claims priority to U.S. Provisional Application No. 62/301,927, filed on Mar. 1, 2016, the entirety of which is incorporated herein by reference.

TECHNICAL FIELD

The present invention relates to an apparatus for sensing and measuring physical displacement between fixed and moving reference frames in order to accurately quantify such displacement as electronic data. More particularly, the present invention is directed at a displacement sensor that uses one or several cantilever beams incorporating calibrated strain sensors to sense mechanical strain caused by bending of the beam(s), the sensed strain then being analyzed and processed to generate movement data.

BACKGROUND

No bridge or building lasts forever, and gradual deterioration is inevitable; movement of cracks in concrete beams, decks, masonry walls or columns, displacement between steel framing members, or small movements in expansion joints will occur in such structures. These movements or displacements may be very slight, but they are indicators of stresses placed on such structures and they can be of vital importance in determining the continued integrity of such structures.

Current solutions consist of monitoring these types of movements and displacements in an attempt to repair or otherwise address them before they grow or present further issues. One such monitoring device is taught in U.S. Pat. No. 9,109,883 to Ansari et al, issued Aug. 18, 2015. Ansari teaches use of an arched member whose ends are respectively attached to the fixed reference frame and moving frame of the structure, the two frames separated by a gap or crack, with a strain gauge attached to said arched member; wherein a gap or crack increasing in size along an axis parallel to the line passing through the attachment points of said arch causes spreading and flattening of said arch, and through prior calibration of the arched member and strain gauge combination the amount of such movement may be reliably measured. However, if relative movements between the fixed reference frame and the moving frame occur in any other axis, such movements will twist or otherwise distort the arched member in a manner inconsistent with that in which it was calibrated, and although movements will be indicated by the strain gauge, the measurements will be erroneous. At one given location in a structure, under real-world conditions, movements of interest between the fixed reference frame and moving frame of the structure may occur in more than one axis. An assembly consisting of multiple arched members arranged orthogonally to each other might be used in an effort to discriminate between and measure movements in multiple axes at one location, but any movements in an axis parallel to a line passing through the attachment points for one arched member still will cause twisting or distortion of the other arched members in the assembly and will result in measurements that are invalid in those other arched members. Therefore, absent prior knowledge of the axis in which movement is occurring, the overall measurement can become ambiguous even with an assembly of multiple arched members arranged orthogonally to each other. Further, if relative movements between the fixed reference frame and the moving frame occur along some axis not parallel with any of the lines passing through the attachment points of any of the arched members in the assembly, the actual axis of movement cannot be determined on the basis of the strain gauge data.

Instrumentation is needed that provides highly accurate and continuous monitoring and measurement of such movements, while being rugged and robust for installation and unattended use in harsh environments over the long term. Further needed, the instrumentation should be able to determine in which axis the movement or displacement is occurring. Such instrumentation will give insights into structural health, help determine safe load limits, will help enable timely and informed application of maintenance resources needed to maintain, preserve and/or extend structure performance, and ultimately will help improve the safety, longevity and reliability of such assets.

In addition to application in bridges and buildings, such instrumentation also would have applications including and not limited to measuring the physical alignment of components, such as in machinery.

SUMMARY

Provided is a new displacement sensor assembly comprising a cantilever beam, a reaction block, a strain sensor, and a temperature sensor, wherein the cantilever beam is physically oriented such that the longitudinal axis of the cantilever beam is perpendicular to the direction of displacement, a first end of the cantilever beam is fixably mounted to a fixed reference and a first end of the reaction block is fixably mounted to a moving reference, a second end of the cantilever beam is joined to a second end of the reaction block, the strain sensor is mounted and calibrated to detect displacement between the fixed and moving reference by measuring strain on the second end of the cantilever beam, and the temperature sensor is mounted and calibrated to counteract the effect of thermal strain on the sensor assembly and a method of use therefore. The disclosed sensor assembly may be configured in several different ways such that it is capable of measuring displacement in one axis, two orthogonal axes, or three orthogonal axes depending on the configuration.

A cantilever beam has mechanical behavior that is fundamentally different from the mechanical behavior of an arched member, and use of a cantilever beam for sensing enables improved decoupling and differentiation of movements in multiple axes; in comparison, an arched member may be unable to differentiate movements in multiple axes. The displacement sensor assembly described and claimed herein thus is superior to a displacement sensor based on one or multiple arched members because the sensor assembly claimed herein is capable of differentiating and unambiguously measuring displacement in one or multiple axes at one location, which is not possible when using arched members. The new sensor assembly described herein, when configured to measure physical displacements in two axes (for example, X and Y), also will accurately measure displacements along any other axis intermediate between X and Y because the strain sensor installed on each cantilever beam indicates deflection only in one axis but the displacement along an axis intermediate between X and Y is defined by the vector sum of the sensed strain values in the two beams. By the same principle, the new sensor assembly, when configured to measure displacements in three axes (X, Y and Z), also will accurately measure physical displacements along any other axes intermediate between the X, Y and Z axes.

The displacement sensor assembly described and claimed herein is further superior to a displacement sensor based on one or more arched members because each cantilever beam may be straight or optionally profiled or shaped as needed to instrument specific or unique structural configurations, to avoid physical obstructions, or to fit in irregular spaces; this avoids physical sensing limitations which may be inherent when attempting to utilize an arched member to instrument a structure in constrained or irregular spaces where a clear line of sight or a straight path may not exist between the two physical frames being measured.

DESCRIPTION

Provided is a new sensor assembly for monitoring and measuring physical displacements between fixed and moving reference frames. The disclosed sensor assembly may be configured in several different ways such that it is capable of measuring displacement in one axis, two orthogonal axes, or three orthogonal axes depending on the configuration.

Figure 1:
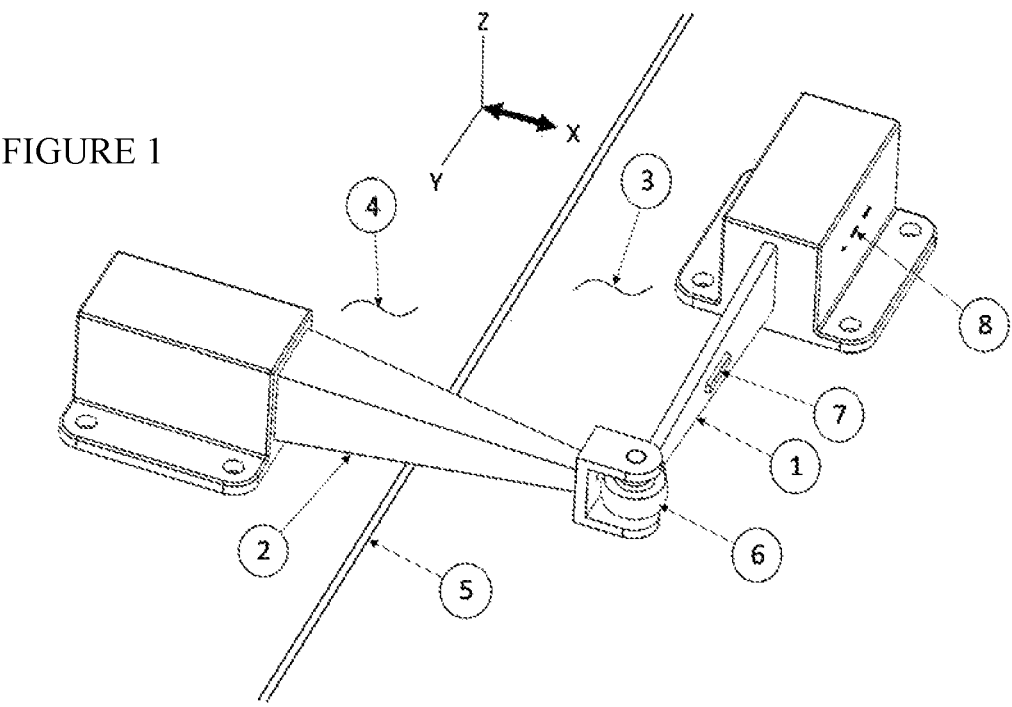
FIG. 1 is an embodiment of the present invention wherein the sensor measures displacement along a single axis.
Figure 2:
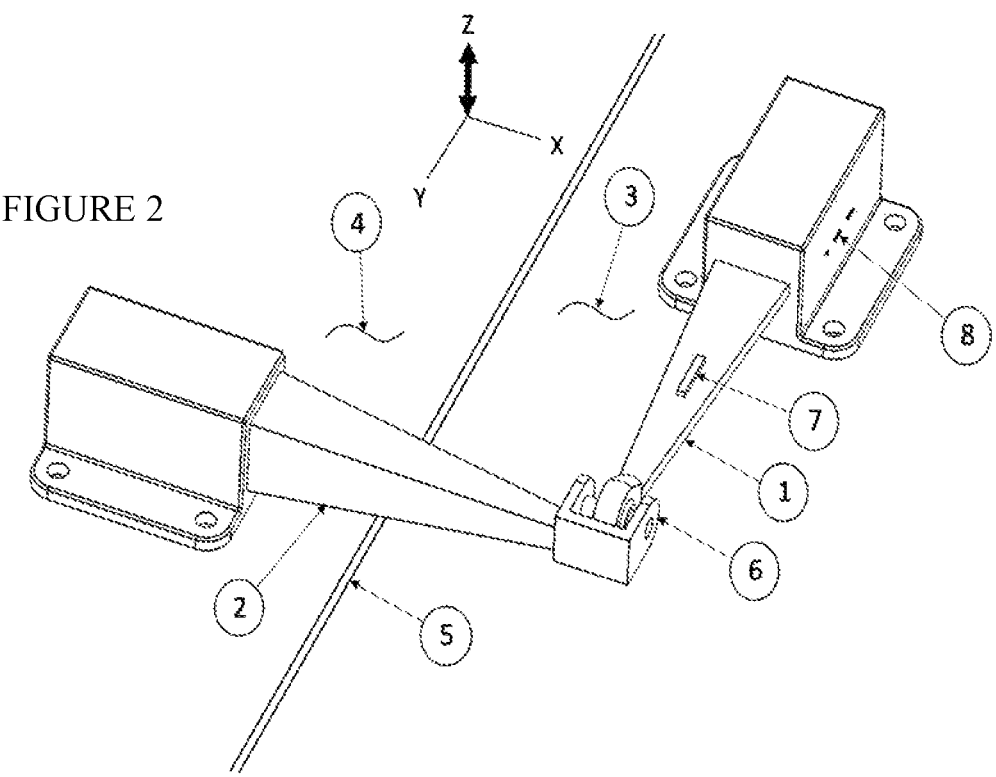
FIG. 2 is an embodiment of the present invention wherein the sensor measures displacement along a single axis different than shown in FIG. 1.

With reference to FIGS. 1 and 2, when configured to measure displacement in one axis, the assembly can have a cantilever beam 1 (hereafter referred to as "beam 1") designed to flex in only one axis. A strain sensor 7 is attached to beam 1 to measure strain values resulting from flexing of beam 1. The assembly can also have a rigid reaction block 2 (hereafter referred to as "block 2") and a temperature sensor 8. The fixed end of beam 1 can be physically mounted to a first mechanical frame, or fixed reference frame 3 and block 2 can be physically mounted to an adjacent second mechanical frame, or moving reference frame 4. A rigid extension of block 2 extends across the physical division 5 between fixed reference frame 3 and moving reference frame 4. The free end of beam 1 can linked to the extension of block 2 at pivot joint 6. Any relative movement between fixed reference frame 3 and moving reference frame 4 along the axis in which beam 1 can flex causes the free end of beam 1 to deflect which results in strain on beam 1, which is then measured by the strain sensor 7 mounted in or on beam 1. The sensed strain is converted through prior calibration into a measure of physical deflection of the end of beam 1, and temperature sensor 8 allows compensation and correction of temperature coefficient of expansion effects in the assembly.

With continued reference to FIGS. 1 and 2, the single axis of displacement is identified either as X or Z as shown in FIG. 1 and FIG. 2 respectively. As shown in both FIGS. 1 and 2, beam 1 is physically oriented with its long axis perpendicular to the direction of displacement. Beam 1 is physically configured so that its flexure is limited to occurrence in one plane thereby causing any movement at the unmounted end of beam 1 to describe an arc which defines one plane. The orientation of beam 1 perpendicular to this arc is such that the plane described by the arc of movement of beam 1 is parallel both to the direction of displacement and to the long axis of beam 1, and a line tangent to the fore-mentioned arc parallels the direction of displacement being measured.

With continued reference to FIGS. 1 and 2, block 2 is physically configured and oriented such that one portion of block 2 is mounted to moving reference frame 4, and another rigid portion of block 2 extends across the physical division 5 between fixed reference frame 3 and moving reference frame 4 but does not contact fixed reference frame 3. The free end of beam 1 and the extended portion of block 2 are physically connected to each other at a pivot joint 6, such that displacement of the moving frame 4 relative to the fixed frame 3 causes flexure of beam 1 and depending on the physical orientation of beam 1, displacement between the fixed and moving reference frames 3 and 4 is measured either in the X direction, as depicted in FIG. 1, or in the Z direction, as depicted in FIG. 2. The strain sensor 7 is attached to beam 1 to measure strain in beam 1 caused by displacements in either the X-direction (FIG. 1) or the Z direction (FIG. 2) as determined by the mounting orientation of beam 1, and a second sensing element 8 sensitive only to temperature is attached to beam 1 as a means to measure or cancel the effects of thermal strain in beam 1.

According to another embodiment, the mounting positions of the beam 1 and block 2 can be reversed such that the orientation of beam 1 can measure displacement solely along the Y axis.

Figure 3:
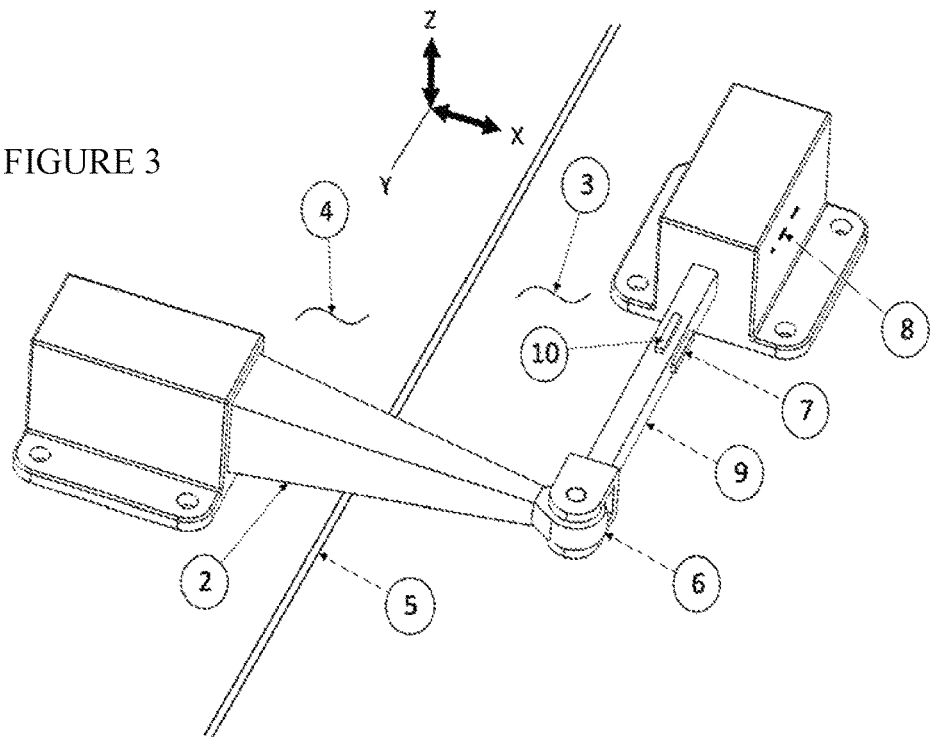
FIG. 3 is an embodiment of the present invention wherein the sensor measures displacement along two axes.

With reference to FIG. 3, when configured to measure displacement in two axes, specifically the X and Z axes as shown, the sensor assembly can have a first cantilever beam 9 (hereinafter referred to as "beam 9") that is designed to flex in two axes. A first strain sensor 7 can be attached to beam 9 to measure strain values resulting from flexing of beam 9 along the X axis and a second strain sensor 10 can be attached to beam 9 to measure strain values resulting from flexing of beam 9 along the Z axis. The assembly can also have a rigid reaction block 2 (hereafter referred to as "block 2") and a temperature sensor 8. The fixed end of the beam 9 can be physically mounted to a first mechanical frame, or fixed reference frame 3 and the block 2 can be physically mounted to an adjacent second mechanical frame, or moving reference frame 4. A rigid extension of the block 2 extends across the physical division 5 between the fixed reference frame 3 and moving reference frame 4. The free end of the beam 9 can linked to the extension of the block 2 at pivot joint 6.

With continued reference to FIG. 3, by virtue of its construction, beam 9 can flex in two directions X and Z, with movement occurring at the unmounted end of beam 9 in a particular direction describing an arc that defines a plane which is parallel both to that particular direction of movement and to the long axis of beam 9. Relative movement between the fixed reference frame 3 and the moving reference frame 4 along either the X or Z axes causes deflection of the free end of beam 9 but not the block 2. Such deflections result in strains on beam 9 which can be measured by the strain sensors 7, 10, attached to the beam 9 with the sensed strain values converted through prior calibrations into measures of physical deflection of the ends of the beam 9. The temperature sensor 8 allows compensation and correction of temperature coefficient of expansion effects in beam 9 and the strain sensors 7, 10. Displacements occurring in intermediate axes between X and Z are measured by vector summation of the strain measurements from sensors 7 and 10.

Figure 4:
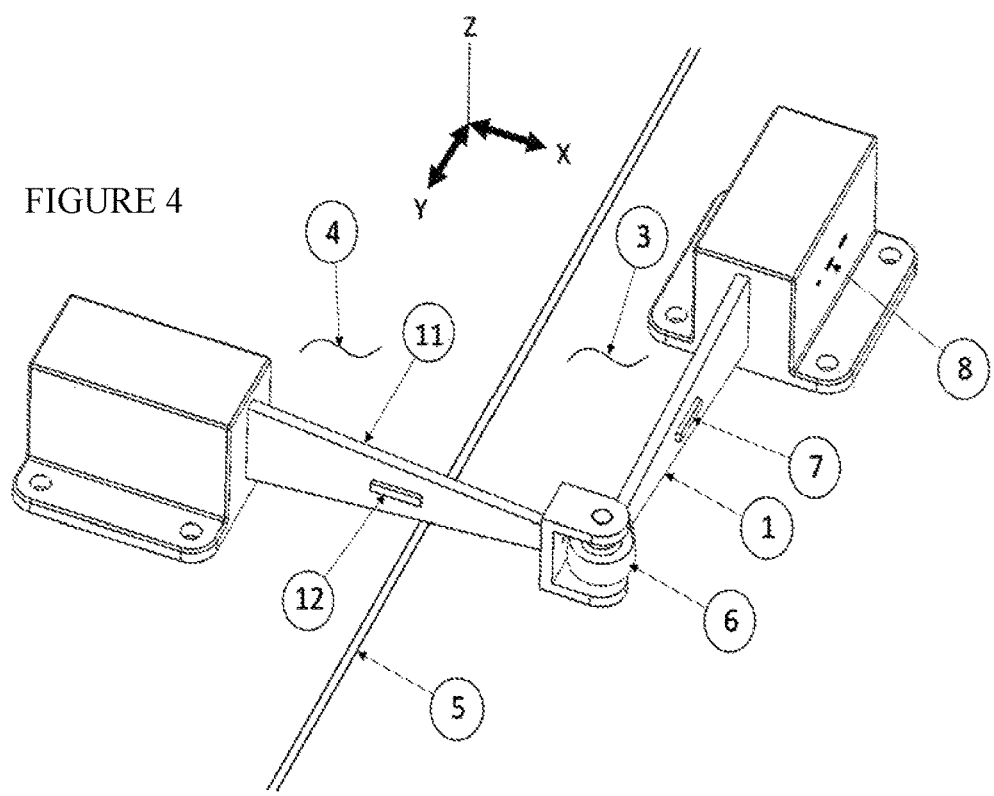
FIG. 4 is an embodiment of the present invention wherein the sensor measures displacement along two axes different than those shown in FIG. 3.

With reference to FIG. 4, when configured to measure displacement in two axes, specifically the X and Y axes as shown, the sensor assembly can have a first cantilever beam 1 (hereinafter referred to as "beam 1") that is designed to flex in only one first axis, e.g. the X axis. A first strain sensor 7 can be attached to the beam 1 to measure strain values resulting from flexing beam 1. The sensor assembly can also include a second cantilever beam 11 (hereinafter referred to as "beam 11") that is designed to flex in only one second axis, e.g. the Y axis, which is orthogonal to the first axis in which beam 1 flexes. A second strain sensor 12 can be attached to beam 11 to measure strain values resulting from flexing of beam 11. The sensor assembly can also include a temperature sensor 8. The fixed end of beam 1 can be physically mounted to a first mechanical frame, or fixed reference frame 3 and the fixed end of beam 11 can be physically mounted to an adjacent second mechanical frame, or moving reference frame 4. Either of beam 1 or beam 11 can extend across the physical division 5 between fixed reference frame 3 and moving reference frame 4 while the free end of beam 1 can be linked to the free end of beam 11 at joint 6. This results in the major physical axes of beams 1 and 11 being orthogonal to each other. Relative movement between fixed reference frame 3 and moving reference frame 4 in the X axis causes deflection of the free end of beam 1 but not beam 11 while relative movement between fixed reference frame 3 and moving reference frame 4 in the Y axis causes deflection of the free end of beam 11 but not beam 1. Such deflections result in strains on the beams 1, 11 which are measured by the strain sensors 7, 12 attached to the beams 1, 11. The sensed strain values are then converted through prior calibrations into measures of physical deflection of the ends of the beams 1, 11, and the temperature sensor 8 allows compensation and correction of temperature coefficient of expansion effects in beams 1, 11 and strain sensors 7, 12. Displacements occurring in intermediate axes between X and Y are measured by vector summation of the strain measurements from sensors 7 and 12.

Figure 5:
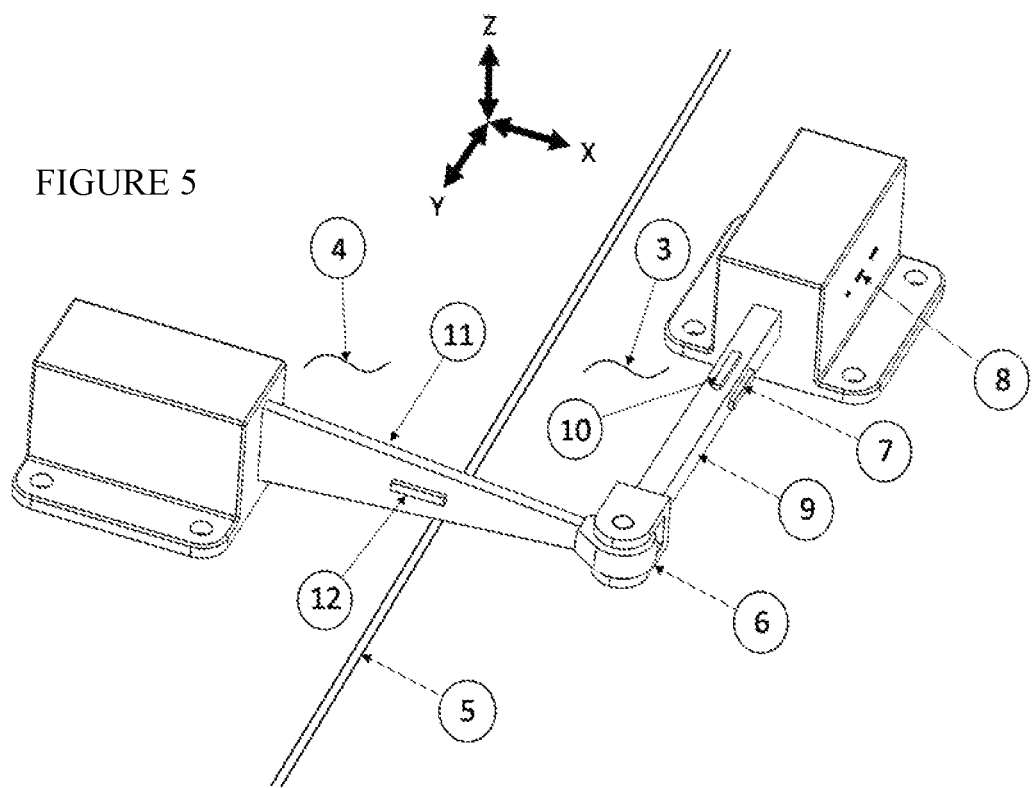
FIG. 5 is an embodiment of the present invention wherein the sensor measures displacement along three axes.

With reference to FIG. 5, when configured to measure displacement in three axes, the sensor assembly can include a first cantilever beam 11 (hereinafter referred to as "beam 11") that is designed to flex in only one axis, e.g. the Y axis, as shown. A first strain sensor 12 can be attached to beam 11 to measure strain resulting from flexing of beam 11. The sensor assembly can also include a second cantilever beam 9 (hereinafter referred to as "beam 9") that is designed to flex in second, e.g. the X axis, and third axis, e.g. the Z axis, which are orthogonal to each other and both of which are orthogonal to the first axis in which beam 11 flexes. A second strain sensor 7 and a third strain sensor 10 can be attached orthogonally to each other on beam 9 to measure strain values resulting from flexing of beam 9 in the second and third axes respectively. The sensor assembly can also include a temperature sensor 8. The fixed end beam 9 can be physically first mechanical frame, or fixed reference frame 3 and the fixed end of beam 11 can be physically mounted to an adjacent second mechanical frame, or moving reference frame 4. Either of beam 9 or beam 11 can extend across the physical division 5 between fixed reference frame 3 and moving reference frame 4 while the free end of beam 9 can be linked to the free end of beam 11 at joint 6. This results in the major physical axes of beams 9 and 11 being orthogonal to each other. Relative movement between fixed reference frame 3 and moving reference frame 4 in the Y axis causes deflection of the free end beam 11 along the same axis, but no deflection of beam 9. Relative movement between fixed reference frame 3 and moving reference frame 4 in the X axis causes deflection of the free end beam 9 along the same axis, but no deflection of beam 11. Relative movement between fixed reference frame 3 and moving reference frame 4 in the Z axis likewise causes deflection of the free end of beam 9 along the same axis, with no deflection of beam 12. Such deflections result in strains on beams 9 and 11 which are measured by the first strain sensor 12, second strain sensor 7, and third strain sensor 10, respectively. The strain measurements are then converted through prior calibrations into measures of physical deflections of the ends of beams 9, 11, and the temperature sensor 8 allows compensation and correction of temperature coefficient of expansion effects in beams 9, 11 and strain sensors 7, 10, and 12. Displacements occurring in intermediate axes between X, Y, and Z are measured by vector summation of the strain measurements from sensors 7, 10, and 12.

According to other embodiments, the orientation of the components of the sensor assembly can be arranged such that movement can be measured about any combination of one, two, or three axes. By way of example, the beams 1, 9, and/or 11 can be configured to measure displacement about the X axis alone, the Y axis alone, the Z axis alone, the X and Y axes, the X and Z axes, the Y and Z axes, or all three axes combined. Displacement occurring about intermediate axes between those discussed herein can be calculated by vector summation of the strain measurements.

Although described in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the present invention should not be limited to any single embodiment, but rather construed in breadth and scope in accordance with the recitations of the appended claims.

Having thus described the invention, it is now claimed.

We claim:

1. A displacement sensor assembly comprising:
   a cantilever beam;
   a reaction block;
   a strain sensor; and
   a temperature sensor;
   wherein the cantilever beam is physically oriented such that the longitudinal axis of the cantilever beam is perpendicular to the direction of displacement;
   wherein a first end of the cantilever beam is fixably mounted to a fixed reference and a first end of the reaction block is fixably mounted to a moving reference;
   wherein a second end of the cantilever beam is joined to a second end of the reaction block;
   wherein the strain sensor is mounted and calibrated to detect displacement between the fixed and moving reference by measuring strain on the second end of the cantilever beam; and
   wherein the temperature sensor is mounted and calibrated to counteract the effect of thermal strain on the sensor assembly.

2. The displacement sensor assembly of claim 1 wherein the strain sensor is mounted on the cantilever beam.

3. The displacement sensor assembly of claim 1 wherein the cantilever beam further comprises a beam that is flexible about two orthogonal axes of detection.

4. The displacement sensor assembly of claim 3 further comprising a second strain sensor wherein the first strain sensor is mounted and calibrated to detect displacement between the fixed and moving reference by measuring strain on the second end of the cantilever beam about a first axis of detection and the second strain sensor is mounted and calibrated to detect displacement between the fixed and moving reference by measuring strain on the second end of the cantilever beam about a second axis of detection, wherein displacement between the first and second axes can be measured by vector summation of the displacement detected by the first, second, or both strain sensors.

5. The displacement sensor assembly of claim 4 wherein the first and second strain sensors are mounted on the cantilever beam.

6. The displacement sensor assembly of claim 4 wherein the reaction block further comprises a second cantilever beam wherein the second cantilever beam is physically oriented such that the longitudinal axis of the second cantilever beam is perpendicular to the direction of displacement about a third axis; wherein a first end of the second cantilever beam is fixably mounted to a moving reference and a second end of the second cantilever beam is joined to a second end of the first cantilever beam.

7. The displacement sensor assembly of claim 6 further comprising a third strain sensor wherein the third strain sensor is mounted and calibrated to detect displacement between the fixed and moving reference by measuring strain on the second end of the second cantilever beam about a third axis of detection, wherein displacement between the first, second, and third axes can be measured by vector summation of the displacement detected by the first, second, or third strain sensors, or a combination of any thereof.

8. The displacement sensor assembly of claim 7 wherein the first and second strain sensors are mounted on the first cantilever beam and the third strain sensor is mounted on the second cantilever beam.

9. A displacement sensor assembly comprising:
a first cantilever beam;
a second cantilever beam;
a first strain sensor;
a second strain sensor;
a third strain sensor; and
a temperature sensor;
wherein the first cantilever beam is physically oriented such that the longitudinal axis of the first cantilever beam is perpendicular to the direction of displacement about a first detection axis and parallel to the direction of displacement about a second detection axis;
wherein the second cantilever beam is physically oriented such that the longitudinal axis of the second cantilever beam is perpendicular to the direction of displacement about a third detection axis;
wherein a first end of the first cantilever beam is fixably mounted to a fixed reference and a first end of the second cantilever is fixably mounted to a moving reference;
wherein a second end of the first cantilever beam is joined to a second end of the second cantilever beam;
wherein the first strain sensor is mounted and calibrated to detect displacement between the fixed and moving reference by measuring strain on the second end of the first cantilever beam about the first axis of detection and the second strain sensor is mounted and calibrated to detect displacement between the fixed and moving reference by measuring strain on the second end of the first cantilever beam about the second axis of detection; and the third strain sensor is mounted and calibrated to detect displacement between the fixed and moving reference by measuring strain on the second end of the second cantilever beam about the third axis of detection;
wherein the temperature sensor is mounted and calibrated to counteract the effect of thermal strain on the sensor assembly; and,
wherein displacement between the first, second, and third axes can be measured by vector summation of the displacement detected by the first, second, or third strain sensors, or a combination of any thereof.

10. A method of measuring displacement between two surfaces comprising the steps of:
a. Providing a displacement sensor assembly comprising;
i. a cantilever beam;
ii. a reaction block;
iii. a strain sensor; and
iv. a temperature sensor;
wherein the cantilever beam is physically oriented such that the longitudinal axis of the cantilever beam is perpendicular to the direction of displacement;
wherein a first end of the cantilever beam is fixably mounted to a fixed reference and a first end of the reaction block is fixably mounted to a moving reference;
wherein a second end of the cantilever beam is joined to a second end of the reaction block;
wherein the strain sensor is mounted and calibrated to detect displacement between the fixed and moving reference by measuring strain on the second end of the cantilever beam; and
wherein the temperature sensor is mounted and calibrated to counteract the effect of thermal strain on the sensor assembly;
b. calibrating the strain sensor to detect displacement of the second end of the cantilever beam;
c. calibrating the temperature sensor to detect the temperature of the sensor assembly;
d. calculating the amount and direction of displacement according to the output of the strain sensor;
e. adjusting the calculated amount and direction of displacement to account for temperature coefficient of expansion effects in the cantilever beam
wherein displacement between the first and second axes can be measured by vector summation of the displacement detected by the first, second, or both strain sensors.

11. The method of claim 10 wherein the cantilever beam further comprises a beam that is flexible about two orthogonal axes of detection.

12. The method of claim 10 wherein the displacement sensor assembly further comprises a second strain sensor wherein the first strain sensor is mounted and calibrated to detect displacement between the fixed and moving reference by measuring strain on the second end of the cantilever beam about a first axis of detection and the second strain sensor is mounted and calibrated to detect displacement between the fixed and moving reference by measuring strain on the second end of the cantilever beam about a second axis of detection.

13. The method of claim 10 wherein the reaction block further comprises a second cantilever beam wherein the second cantilever beam is physically oriented such that the longitudinal axis of the second cantilever beam is perpendicular to the direction of displacement about a third axis; wherein a first end of the second cantilever beam is fixably mounted to a moving reference and a second end of the second cantilever beam is joined to a second end of the first cantilever beam.

14. The method of claim 13 further comprising a third strain sensor wherein the third strain sensor is mounted and calibrated to detect displacement between the fixed and moving reference by measuring strain on the second end of the second cantilever beam about a third axis of detection, wherein displacement about intermediate axes between the first, second, and third axes can be measured by vector summation of the displacement detected by the first, second, or third strain sensors, or a combination of any thereof.

15. The method of claim 14 wherein the first and second strain sensors are mounted on the first cantilever beam and the third strain sensor is mounted on the second cantilever beam.

\* \* \* \* \*